Figure 1:
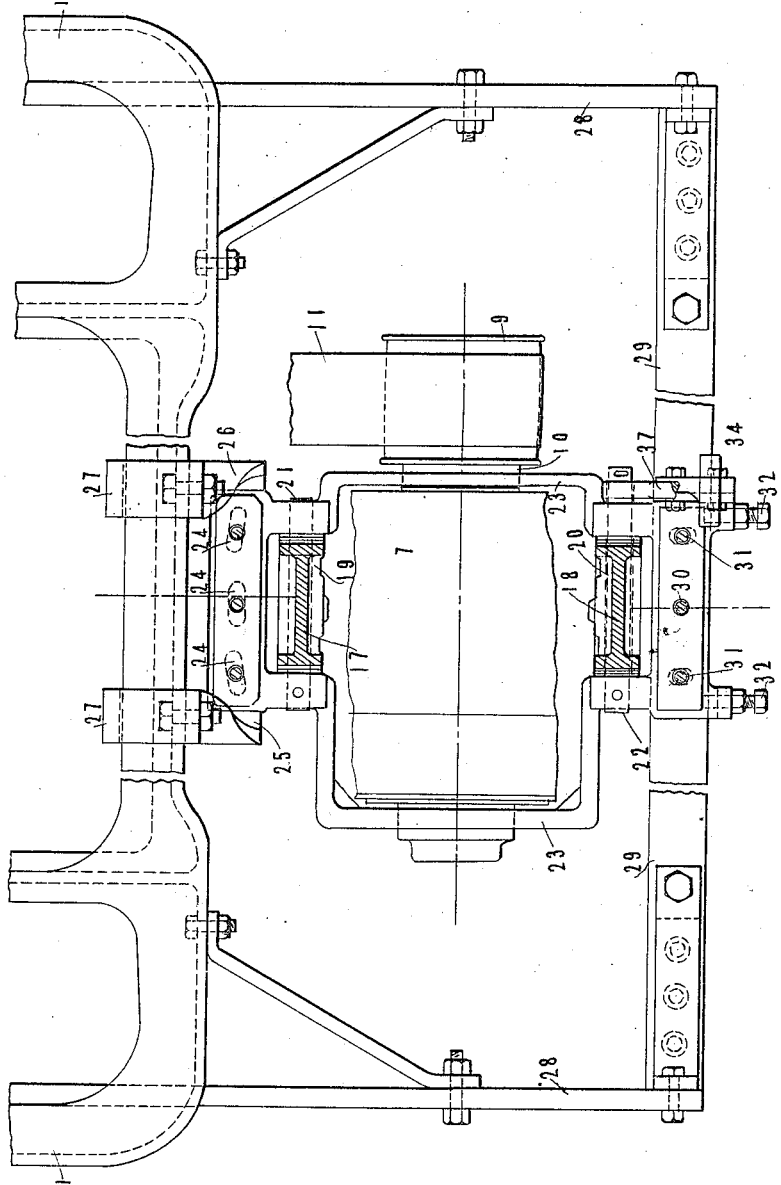

W. I. THOMSON.
DYNAMO MOUNTING.
APPLICATION FILED DEC. 14, 1912.

1,148,551.

Patented Aug. 3, 1915.
3 SHEETS—SHEET 1.

WITNESSES:
N. Krapish

INVENTOR
W. I. Thomson
BY
ATTORNEYS

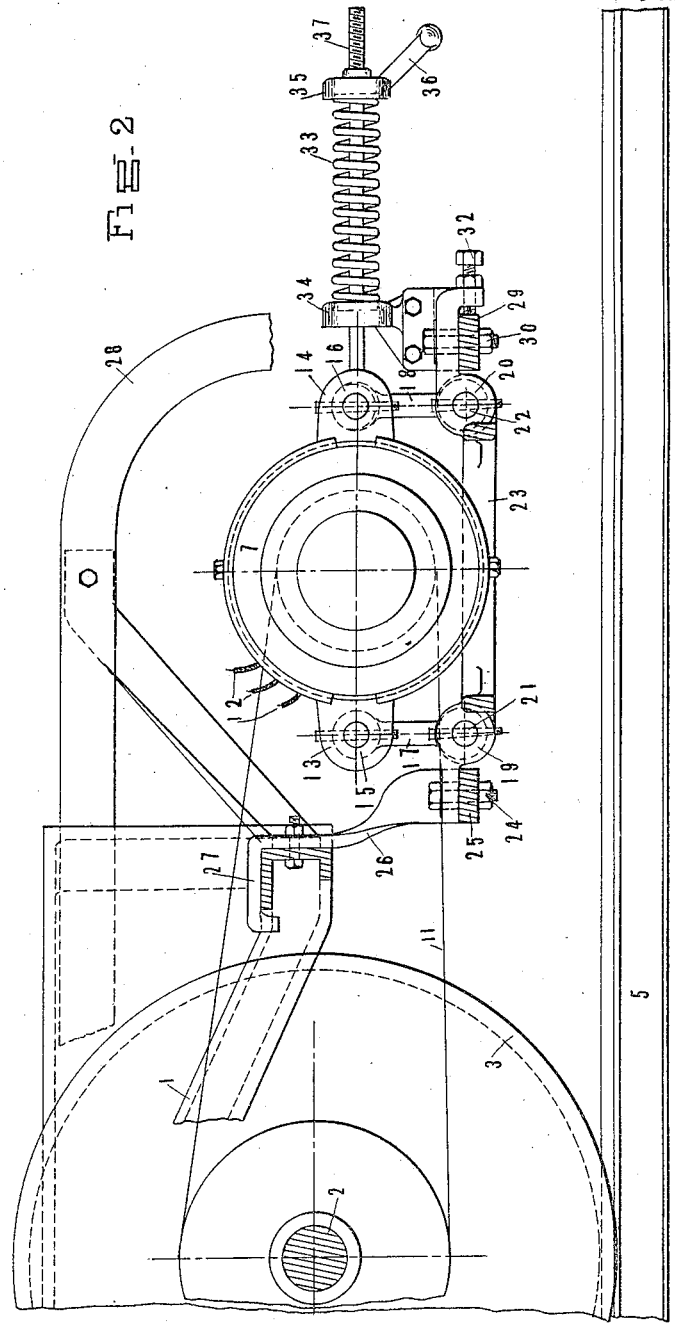

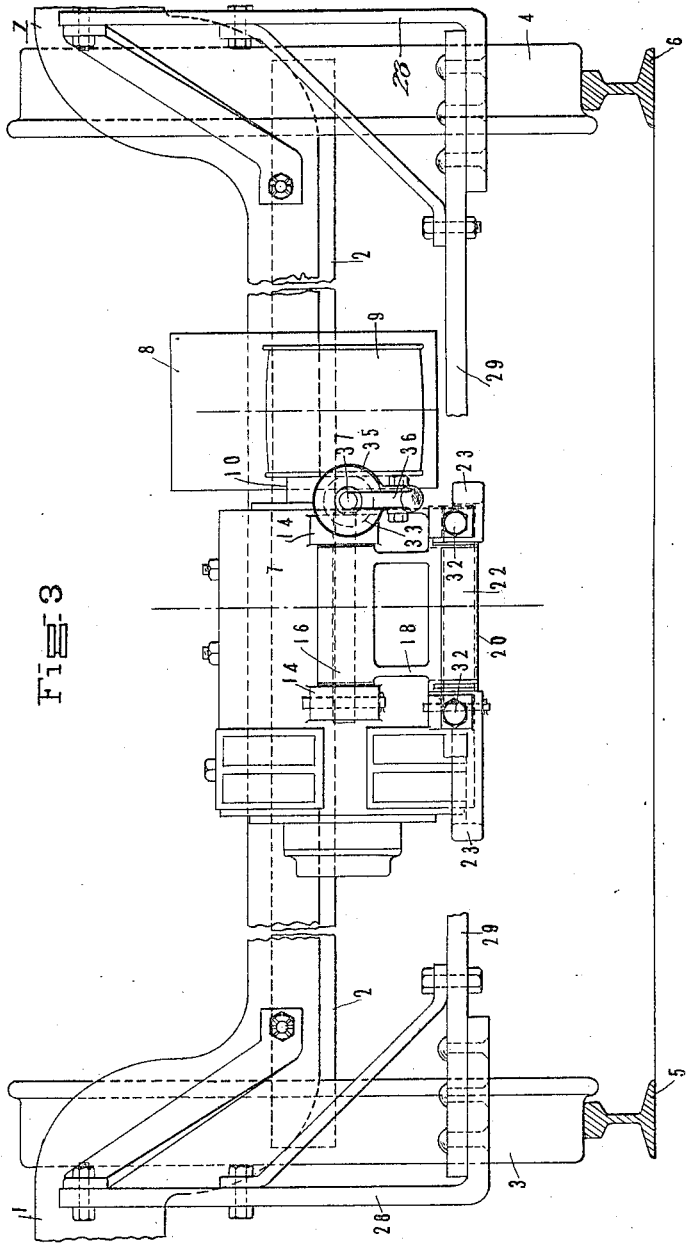

UNITED STATES PATENT OFFICE.

WILLIAM I. THOMSON, OF NEWARK, NEW JERSEY, ASSIGNOR TO THE SAFETY CAR HEATING & LIGHTING COMPANY, A CORPORATION OF NEW JERSEY

DYNAMO-MOUNTING.

1,148,551. Specification of Letters Patent. Patented Aug. 3, 1915.

Application filed December 14, 1912. Serial No. 736,685.

*To all whom it may concern:*

Be it known that I, WILLIAM I. THOMSON, a citizen of the United States, residing at Newark, in the county of Essex and State of New Jersey, have invented certain new and useful Improvements in Dynamo-Mounting, of which the following is a full, clear, and exact description, such as will enable others skilled in the art to which it appertains to make and use the same.

This invention relates to the mounting of electrical machinery, and, with regard to certain more specific features, to the mounting of a dynamo adapted to be driven from a car axle.

One of the objects of the present invention is to provide a dynamo mounting of simple, cheap and compact structure and efficient action.

Another object is to provide a mounting of the above type in which the parts are so disposed as to hang low upon a car truck without interfering with parts of the car or truck and yet perform their functions effectively.

Another object is to provide a dynamo mounting in which the parts are readily accessible and yet the dynamo is securely and safely supported.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the drawings, in which is illustrated one of various possible embodiments of the invention, Figure 1 is a plan view of part of a steel car-truck with a dynamo mounted thereon in accordance with the invention; Fig. 2 is a longitudinal elevation, partly in section, of the apparatus shown in Fig. 1; and Fig. 3 is an end elevation of the same.

Similar reference characters refer to similar parts throughout the several views of the drawings.

Referring now to the drawings, there is illustrated at 1 a portion of a steel car-truck of any suitable or approved construction, provided with the necessary mechanism for securing thereto the axle 2 carrying the wheels 3, 4 adapted to run on the rails 5, 6. The rotation of the wheels 3, 4 on the rails 5, 6 is utilized to drive a dynamo 7 as by the pulley 8 on the axle 2, the pulley 9 on the dynamo shaft 10, and the interconnecting belt 11.

It may here be noted that the term "dynamo" is used throughout this specification and the following claims in what is believed to be its accurate technical meaning, namely, as designating a piece of electrical machinery which is employed either to generate electric current or to transform the same into mechanical energy. In the present instance, the illustration relates more particularly to a machine for generating electric current. A belt drive is illustrated, because it has been found satisfactory in actual service, although it will be obvious that many features of the present invention would be equally applicable to dynamos provided with other forms of power transmitting mechanism. The electrical power generated by the dynamo is conducted as by the wires 12 to suitable regulating devices, and thence to translating devices located preferably on or in the car.

Coming now to the embodiment of the mounting illustrated in the drawings, the dynamo 7 is provided with lugs 13, 14, at its opposite ends engaging the upper horizontal shafts 15 and 16, to which are pivotally secured the substantially vertical and preferably parallel plates 17, 18, thus making the belt tension independent of the direction of rotation of the dynamo. It is to be understood that the term "plate" is used throughout as comprehending a rigid member extending, not necessarily uninterruptedly, over a material surface rather than along a line. These plates are adapted as by connections at 19, 20 with the lower horizontal shafts 21, 22 for pivotal movement with respect to opposite portions of the horizontal bed 23. The upper and lower shafts are preferably prevented from turning with the plates 17, 18, so that all wear comes on the two relatively cheap plates. The wear on the plates may be reduced to a negligible quantity by greasing the two bearing points in each plate and protecting them by felt washers. The bed in turn is adjustably secured at one end as by the bolt and slot connections at 24 to the transverse portion 25 of the depending yoke or stirrup 26 mounted at 27, 27 on the truck frame 1. The other end of the bed 23 is likewise adjustably secured to the truck frame 1 by means of the depending members 28, the transverse bar 29, the bolt 30 and the bolt and slot connections at 31. The several slots at 24, 31 are arcuate in shape, and are struck about the axis of the vertical bolt 30 as a center, thereby providing for the adjustment as a unit of the bed 23, the dynamo 7 and the associated parts about the axis of bolt 30 as a vertical pivot; by this means the dynamo shaft may be readily and accurately brought into parallelism with the car axle 2. In addition to the securing and adjusting means provided in the bolts at 24, 31, there are illustrated at 32 two bolts with suitable lock nuts, whereby the dynamo 7 may be adjusted precisely and securely held in its adjusted position. The belt 11 is kept at the desired tension by the compression spring 33 mounted between the cup or seat 34 secured to the bed 23 and the cup or seat 35 adapted, as by means of the locking means 36 to be adjustably positioned on the screw-threaded rod 37 secured in the present instance by the shaft 16 to the dynamo 7. As will be clear from the drawings, this arrangement provides a compact and easily accessible mounting in which the dynamo is kept low and out of the way of the deep center sills used in modern steel car construction, and a maximum clearance is insured above and below the apparatus, as no part of the device projects above or below the dynamo itself.

The operation of the illustrated embodiment of the invention is as follows: The dynamo 7, together with the bed 23, the supporting plates 17, 18 and the tension device, is adjusted with respect to the truck frame 1 by means of the bolt and slot connections at 24, 31, about the bolt 30 as a pivot until the dynamo shaft 10 is parallel to the driving axle 2. The bolts at 24, 30, 31 and the adjusting bolts 32 are then made fast and the swinging plates 17, 18, by keeping the upper and lower shafts 15, 16, 21 and 22 at all times in a constant angular relation, preferably parallel, without any adjustment whatever, preserve the alinement of the driving and driven pulleys. After alining the axle and the dynamo shaft, the desired belt tension is obtained by means of the adjustable cup 35, and the parts are so proportioned that when the belt tension has been adjusted, the plates 17 and 18 are preferably substantially vertical, so that vertical shocks to the truck will not affect the tension of the driving belt. If at any time some part should break and allow the dynamo to fall, the disastrous consequences that too often result from the dynamo falling on the track are avoided, for the dynamo simply drops a few inches to the supporting bed 23 and is there carried in perfect safety as long as may be necessary.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In apparatus of the class described, in combination, an axle, a truck, a dynamo, means adapted to support the dynamo on the truck, said means comprising swinging plates, and power transmitting means connecting the dynamo and the axle.

2. In apparatus of the class described, in combination, an axle, a truck, a dynamo, means adapted to support the dynamo on the truck, said means comprising swinging plates pivotally connected to opposite portions of the dynamo, and power transmitting means connecting the dynamo and the axle.

3. In apparatus of the class described, in combination, an axle, a truck, a dynamo, means adapted to support the dynamo on the truck, said means comprising a member secured to said truck and a pair of plates each pivotally connected to said member and said dynamo, and power transmitting means connecting the dynamo and the axle.

4. In apparatus of the class described, in combination, an axle, a truck, a dynamo, means adapted to support the dynamo on the truck, said means comprising a bed adapted to swing about a vertical pivot, and power transmitting means connecting the dynamo and the axle.

5. In apparatus of the class described, in combination, an axle, a truck, a dynamo, means adapted to support the dynamo on the truck, said means comprising upright swinging plates, and power transmitting means connecting the dynamo and the axle.

6. In apparatus of the class described, in combination, an axle, a truck, a dynamo, means adapted to support the dynamo on the truck, said means comprising upright swinging plates pivotally connected to opposite portions of the dynamo, and power transmitting means connecting the dynamo and the axle.

7. In apparatus of the class described, in combination, an axle, a truck, a dynamo, means adapted to support the dynamo on the truck, said means comprising a member secured to said truck and a pair of upright plates each pivotally connected to said member and said dynamo, and power transmitting means connecting the dynamo and the axle.

8. In apparatus of the class described, in combination, an axle, a truck, a dynamo, means adapted to support the dynamo on the truck, said means comprising parallel plates, and power transmitting means connecting the dynamo and the axle.

9. In apparatus of the class described, in combination, an axle, a truck, a dynamo, means adapted to support the dynamo on the truck, said means comprising swinging parallel plates, and power transmitting means connecting the dynamo and the axle.

10. In apparatus of the class described, in combination, an axle, a truck, a dynamo, means adapted to support the dynamo on the truck, said means comprising upright swinging parallel plates, and power transmitting means connecting the dynamo and the axle.

11. In apparatus of the class described, in combination, an axle, a truck, a dynamo, means adapted to support the dynamo on the truck, said means comprising a pivotally mounted bed and swinging plates connected to said bed and said dynamo, and power transmitting means connecting the dynamo and the axle.

12. In apparatus of the class described, in combination, an axle, a truck, a dynamo, means adapted to support the dynamo on the truck, said means comprising a pivotally mounted bed and swinging plates pivotally connected to said bed and to opposite portions of said dynamo, and power transmitting means connecting the dynamo and the axle.

13. In apparatus of the class described, in combination, an axle, a truck, a dynamo, means adapted to support the dynamo on the truck, said means comprising a pivotally mounted bed and a pair of plates each pivotally connected to said member and said dynamo, and power transmitting means connecting the dynamo and the axle.

14. In apparatus of the class described, in combination, an axle, a truck, a dynamo, means adapted to support the dynamo on the truck, said means comprising an adjustably mounted bed and swinging plates connected to said bed and said dynamo, and power transmitting means connecting the dynamo and the axle.

15. In apparatus of the class described, in combination, an axle, a truck, a dynamo, means adapted to support the dynamo on the truck, said means comprising a bed adjustably mounted on said truck and a pair of plates each pivotally connected to said bed and said dynamo, and power transmitting means connecting the dynamo and the axle.

16. In apparatus of the class described, in combination, an axle, a truck, a dynamo, means adapted to support the dynamo on the truck, said means comprising a pivotally mounted bed and upright swinging parallel supports between said bed and said dynamo, and power transmitting means connecting the dynamo and the axle.

17. In apparatus of the class described, in combination, an axle, a truck, a dynamo, means adapted to support the dynamo on the truck, said means comprising a bed pivotally mounted on said truck and plates each pivotally connected to said bed and said dynamo, and power transmitting means connecting the dynamo and the axle.

18. In apparatus of the class described, in combination, an axle, a truck, a dynamo, means adapted to support the dynamo on the truck, said means comprising a bed adjustably mounted on said truck and plates each pivotally connected to said bed and said dynamo, and power transmitting means connecting the dynamo and the axle.

19. In apparatus of the class described, in combination, an axle, a truck, a dynamo, means adapted to support the dynamo on the truck, said means comprising a bed adjustably mounted on said truck and a pair of plates each pivotally connected with said member and said dynamo, and power transmitting means connecting the dynamo and the axle.

20. In apparatus of the class described, in combination, an axle, a truck, a dynamo, means adapted to support the dynamo on the truck, said means comprising a bed adjustable for pivotal movement and swinging plates between said bed and said dynamo, and power transmitting means connecting the dynamo and the axle.

21. In apparatus of the class described, in combination, an axle, a truck, a dynamo, means adapted to support the dynamo on the truck, said means comprising a bed adjustable for pivotal movement and upright swinging supports between said bed and said dynamo, and power transmitting means connecting the dynamo and the axle.

22. In apparatus of the class described, in combination, an axle, a truck, a dynamo, means adapted to support the dynamo on the truck, said means comprising a bed adjustable for movement about a vertical pivot and parallel supports between said bed and said dynamo, and power transmitting means connecting the dynamo and the axle.

23. In apparatus of the class described, in combination, an axle, a truck, a dynamo, means adapted to support the dynamo on the truck, said means comprising a bed adjustable for movement about a vertical pivot and upright swinging parallel supports between said bed and said dynamo, and power transmitting means connecting the dynamo and the axle.

24. In apparatus of the class described, in combination, an axle, a truck, a dynamo, means adapted to support the dynamo on the truck, said means comprising a bed adjustable for pivotal movement and upright swinging parallel plates between said bed and said dynamo, and power transmitting means connecting the dynamo and the axle.

25. In apparatus of the class described, in combination, an axle, a truck, a dynamo, means adapted to support the dynamo on the truck, said means comprising swinging plates pivotally connected to opposite portions of the dynamo, a belt drive between the dynamo and the axle, and means for maintaining the belt under tension.

26. In apparatus of the class described, in combination, an axle, a truck, a dynamo, means adapted to support the dynamo on the truck, said means comprising a pivotally mounted bed and swinging plates connected to said bed and said dynamo, a belt drive between the dynamo and the axle, and means for maintaining the belt under tension.

27. In apparatus of the class described, in combination, an axle, a truck mounted upon said axle, supporting means upon said truck, a generator mounted upon said supporting means by an upwardly extending swinging device permitting the generator to swing downwardly on each side of its uppermost position, power transmitting means connecting said axle and said generator and adapted to drive said generator from said axle, resilient means tending to swing said generator away from said axle with a resultant effective force which is less when the generator moves downwardly away from the axle than it is when the generator moves downwardly toward the axle, and means adapted to swing the axis of said generator angularly with respect to the axis of said axle.

In testimony whereof I affix my signature, in the presence of two witnesses.

WILLIAM I. THOMSON.

Witnesses:
E. E. ALLBEE,
MAXWELL GREENBERGER.